(12) United States Patent
Forler et al.

(10) Patent No.: US 7,676,822 B2
(45) Date of Patent: Mar. 9, 2010

(54) AUTOMATIC ON-SCREEN DISPLAY OF AUXILIARY INFORMATION

(75) Inventors: Joseph Wayne Forler, Indianapolis, IN (US); Patrick John Kennedy Deighan, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1931 days.

(21) Appl. No.: 09/758,480

(22) Filed: Jan. 11, 2001

(65) Prior Publication Data

US 2002/0089606 A1    Jul. 11, 2002

(51) Int. Cl.
*H04N 7/10*     (2006.01)
*H04N 7/025*    (2006.01)
*G06F 3/00*     (2006.01)
*G06F 13/00*    (2006.01)
*H04N 5/445*    (2006.01)

(52) U.S. Cl. .............................. 725/32; 725/37; 725/43; 725/59; 348/563; 348/565

(58) Field of Classification Search .................... 725/40, 725/41, 42, 43, 38, 39, 57, 60, 61, 112, 109, 725/110, 32, 37, 59; 348/563, 564; *H04N 5/445, H04N 7/173; G06F 3/00, 13/00*
See application file for complete search history.

(56) References Cited

U.S. PATENT DOCUMENTS

| | | | |
|---|---|---|---|
| 5,512,954 A | 4/1996 | Shintani | 348/468 |
| 5,557,338 A | 9/1996 | Maze et al. | 348/565 |
| 5,734,436 A | 3/1998 | Abe et al. | |
| 5,847,703 A | 12/1998 | Teicher et al. | |
| 5,999,216 A | 12/1999 | Kaars | 348/385 |
| 6,049,333 A | 4/2000 | LaJoie et al. | |
| 6,055,023 A | 4/2000 | Rumreich et al. | 348/553 |
| 6,064,438 A | 5/2000 | Miller | |
| 6,219,042 B1* | 4/2001 | Anderson et al. | 345/327 |
| 6,415,438 B1* | 7/2002 | Blackketter et al. | 725/136 |
| 6,463,468 B1* | 10/2002 | Buch et al. | 709/219 |
| 6,493,506 B1* | 12/2002 | Schoner et al. | 386/126 |
| 6,507,351 B1* | 1/2003 | Bixler | 715/810 |
| 6,536,041 B1* | 3/2003 | Knudson et al. | 725/39 |
| 6,604,242 B1* | 8/2003 | Weinstein et al. | 725/109 |
| 6,668,278 B1* | 12/2003 | Yen et al. | 709/218 |
| 2008/0307460 A1* | 12/2008 | Knudson et al. | 725/50 |

FOREIGN PATENT DOCUMENTS

| | | |
|---|---|---|
| EP | 0766463 A2 | 4/1997 |
| EP | 0825770 A1 | 2/1998 |

(Continued)

*Primary Examiner*—Christopher Kelley
*Assistant Examiner*—Farzana Hossain
(74) *Attorney, Agent, or Firm*—Robert D. Shedd; Harvey D. Fried; Joel M. Fogelson

(57) ABSTRACT

A system, method and apparatus for displaying real time auxiliary information from a secondary source or input signal in combination with a program from a separate primary source. The auxiliary information (e.g. textual, graphical or video images) is selectable and is received through a second, integral or stand-alone tuner. The selected information can be displayed (1) continuously, (2) at predefined regular intervals, or (3) as the (defined) event(s) occur either in real time or in memory to provide a short delay time. The auxiliary information may be part of a currently transmitted data stream or as a separate data stream.

20 Claims, 2 Drawing Sheets

FOREIGN PATENT DOCUMENTS

| | | |
|---|---|---|
| EP | 1024661 A2 | 8/2000 |
| EP | 1 089 560 A1 | 4/2001 |
| JP | 1-218276 A | 8/1989 |
| JP | 9-018841 A | 1/1997 |
| JP | 9-046658 A | 2/1997 |
| JP | 11-136650 A | 5/1999 |
| JP | 11-164215 A | 6/1999 |
| WO | WO 98/27729 | 6/1998 |
| WO | WO 99/66722 A1 | 12/1999 |
| WO | WO00/59213 | 10/2000 |

* cited by examiner

AUTOMATIC ON-SCREEN DISPLAY OF AUXILIARY INFORMATION

FIELD OF THE INVENTION

The present invention relates to televisions, television signal receivers, video processing apparatus, and/or television signals and, more particularly, to a method and apparatus for displaying real time auxiliary information from a secondary input signal on a television, television signal receiver, and/or display.

BACKGROUND OF THE INVENTION

Certain television channels, such as ESPN®, CNN®, and CNBC® will display sports scores and stock quotes while their program is airing. Other broadcasters will display, for example, scores from college football games while another game is being televised. However, an individual must be tuned to one of these particular channels in order to see these updates. In addition, the user has no control over how often or when this information is displayed.

It is known to provide auxiliary information within a television channel such as closed captioning and teletext information. It is also known to provide auxiliary information for electronic program guides. StarSight Telecast, Inc. (StarSight®) has a feature called StarSight® NEWS (News, Entertainment, Weather, Sports) Service which is a part of their electronic program guide. This feature allows the user to manually activate a full screen display to access news and sports stories, scores, and other information. When the StarSight® NEWS Service feature is activated by the user, it automatically blanks the video, mutes the audio, and tunes the television's tuner to the StarSight® data provider channel (e.g. PBS). The user cannot, however, watch any other channel or program while the feature is activated.

There is no system, however, that allows a user to watch one television program and monitor information pertaining to unrelated topics. There are many instances where it is desirable to receive up to the minute information that is not provided by the current program or channel. Thus, the prior art is deficient, since the user is not able to get up to the minute sports scores, news headlines, stock quotes or other information via a television or other television reception device such as a VCR, cable box, etc. (television signal device), while watching any program or channel on the television signal device.

SUMMARY OF THE INVENTION

The present invention pertains to a system for displaying real time auxiliary information from a secondary source or input signal while a user has selected a primary source (i.e. another channel). The selectable auxiliary information is irrespective of the primary source.

In one form, the present invention is a method for displaying user selected information. The method includes the steps of (a) providing video received from a first source to a display device; (b) selecting a type of information to be received; (c) receiving the selected information from a second source; and (d) providing the selected information from the second source to the display device to be displayed while the video from the first source is being displayed.

In another form, the present invention is a video processing television apparatus. The video processing television apparatus includes first means for receiving a program, means for selecting a type of information to be received, second means for receiving the selected information, means for displaying the program, and means for displaying the selected information during display of the program.

The present invention thus allows a viewer to automatically show selectable information on a display regardless of the current program or channel being viewed. The information may be shown on a user-selectable schedule, and within a portion of the display without substantially disturbing the audio and/or video of the current program/channel. The user may also select categories of information to be displayed via an on-screen menu. This may be accomplished by providing the information within or as auxiliary information/data carried by a secondary channel, program, or signal.

The present invention may be used with various types of consumer electronic devices such as televisions (TVs), television signal receivers, set top boxes, cable boxes, VCRs, direct broadcast satellite receivers, program guide set top boxes, converters, personal computers, digital video disk (DVD) players, web browsers, and combination personal computer televisions (PC/TVs).

In a regular interval operating mode, the information is displayed in response to a timer event; possibly the display device's internal clock is monitored. In an as the event occurs operating mode, selected auxiliary information is only displayed if it has changed or is new. This is accomplished by having associated flags within data packets for identification and revision for the status of the selected auxiliary information. In a continuous mode, the information is displayed continuously over the particular program being viewed. The auxiliary information may be extracted from the second source before or after user selection of a type of information of the auxiliary information to be displayed.

BRIEF DESCRIPTION OF THE DRAWINGS

Reference to the following description of the present invention should be taken in conjunction with the accompanying drawings, wherein.

Corresponding reference characters indicate corresponding parts throughout the several views.

DETAILED DESCRIPTION OF THE INVENTION

Figure 1:
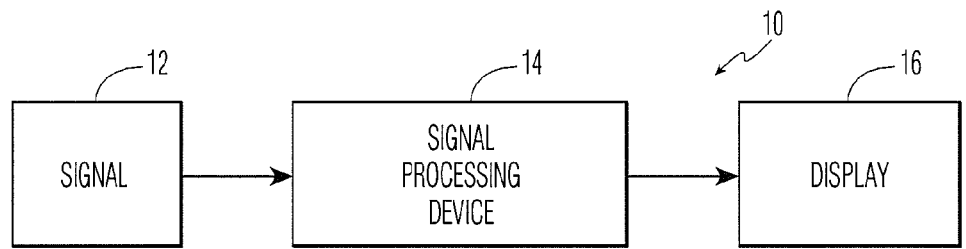
FIG. 1 is a diagrammatic representation of a system operable to implement the principles of the present invention.

With reference to FIG. 1, there is depicted a block diagram, generally designated 10, of a system operable to implement the principles of the present invention. The system 10 includes an input signal 12 that is received by a signal processing device 14. The signal processing device 14 is coupled to a display 16 that is operable to show or display video and other information from the signal processing device 14. The signal processing device 14 processes the signal 12 as detailed below.

The signal 12 is preferably a television signal that carries a variety of programming on a plurality of channels. The signal 12 may be analog, digital, or a combination of analog and digital data/information and may be provided to the signal processing device 14 via any known transmission medium, such as cable TV (CATV), terrestrial broadcast, satellite broadcast, electronic network (e.g. the Internet) and the like. The programming typically consists of audio and video, but may be just audio or just video. In accordance with an aspect of the present invention, at least one channel or program of the signal 12 carries auxiliary information/data. In accordance with another aspect of the present invention, the signal 12 may be a composite signal from two or more separate sources. In this case, each source provides at least one channel or program, with one channel or program of one of the signals of the composite signal carrying auxiliary information/data.

In the case of an analog television signal being the signal 12, the auxiliary information may be carried within the vertical blanking interval (VBI). The auxiliary information would include appropriate headers and the like to identify the data as auxiliary information. As well, the auxiliary information preferably includes other identifiers, markers, or the like as further explained below, particularly to identify the type of auxiliary information and whether there has been a status change in the auxiliary information. Other identifiers and/or markers may be included within or as part of the auxiliary information such as are known in the art, or developed, in order to implement the transmission of auxiliary information within the VBI, reception and decoding thereof. The auxiliary information of the signal 12 may be provided in manners other than via the VBI.

In the case of a digital television signal being the signal 12, the digital television constitutes a digital data stream that is receivable by a digital television or television signal device such as a high definition television (HDTV) or standard definition digital televisions. The auxiliary information may be included as part of a digital data stream of a digital television signal or the like. In this case, the data stream would include appropriate headers and other identifiers for the auxiliary information.

It should be appreciated that the signal 12 may be provided by a single provider or may be provided by separate or multiple providers. In the case of a single provider, a first channel of the signal 12 carries a program (i.e. video and/or audio) while a second channel of the signal 12 carries at least the auxiliary information and, may include a program as well. Typically, in the case of a television signal being the signal 12, there are a plurality of channels that carry strictly programming, while a single channel carries at least the auxiliary information. The auxiliary information or data may be combined with other information and/or data, or with programming. However, the signal 12 preferably constitutes at least two channels, one carrying programming, the other carrying at least the auxiliary information.

It should be appreciated that the signal 12 may come from separate sources as well as from a single source. In the case of separate sources, one source may provide a first signal having programming for showing on the display 16, while another source may provide a second signal having at least the auxiliary data. The second signal may contain programming or the like in addition to the auxiliary data. The signal 12 may thus originate as a terrestrial broadcast, a satellite broadcast, a CATV transmission, the Internet, or via any other source(s) capable of providing programming and auxiliary information as described herein.

Additionally, the auxiliary information may include commands that inform a receiving device that the data is intended for the present purpose and/or inform the receiving device that a specific piece of data is new or modified (e.g. an updated score). With this data, the receiving device will immediately display the information if so chosen by the user.

The signal processing device 14 includes appropriate circuitry/logic to receive the signal 12 and perform various processing thereof. In particular, the signal processing device 14 is operable to receive the signal 12 and provide programming of one (a first) channel or the like to the display 16 as well as selected auxiliary information from another (a second) channel. The auxiliary information/data may be textual, graphical or video images. The signal processing device 14 is thus able to separate the two channels from the signal 12, process one channel to obtain its programming that is input to the display 16, as well as extract or obtain the auxiliary information from another channel to obtain its auxiliary information and provide selected auxiliary information to the display 16. The user is able to select the type and/or category of auxiliary information to be displayed, rather than just having all of the auxiliary information displayed as occurs with closed captioning, as well as a frequency schedule for the display thereof. While the auxiliary information preferably includes data on a plurality of topics (e.g. sports scores, stocks, news, etc.) typically only a portion of the auxiliary information is selected for display on the display 16.

Thus, display of the auxiliary information is on a user-selectable basis. The chosen auxiliary information can be displayed (1) continuously, (2) at predefined regular intervals, or (3) as the (defined) event(s) occur either in real time or in memory to provide a short delay time. It should be appreciated that extraction of the auxiliary information and/or a type of auxiliary information from the signal of the second source may be accomplished before or after the user selects a type of information from the auxiliary information. Depending on whether the auxiliary information is extracted before or after user selection of information, various amounts of auxiliary information are stored in memory.

Figure 2:
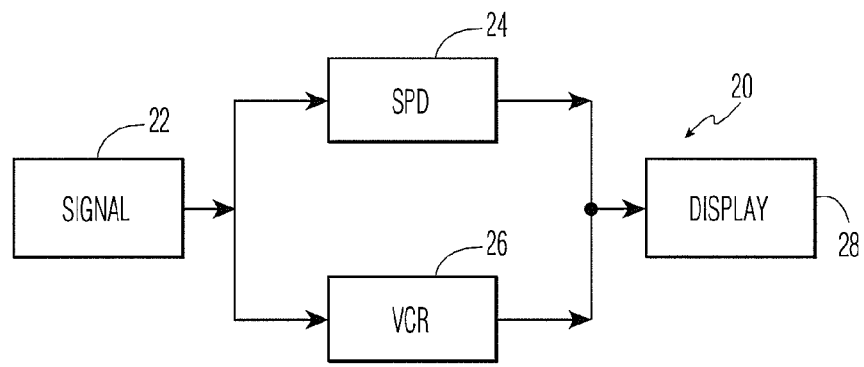
FIG. 2 is a diagrammatic representation of another system operable to implement the principles of the present invention.

Referring to FIG. 2, there is shown a block diagram, generally designated 20, of another system that is operable to implement the principles of the present invention. The system 20 includes a signal 22 of the same characteristics as the signal 12, a signal processing device 24, a VCR 26 (or similar device), and a display 28. The system 20 is operable to receive the signal 22 and provide a program to the display 28 as well as selected auxiliary information.

In FIG. 2, the signal processing device 24 is operable to either receive a first channel of the signal 22 and provide programming carried thereby to the display 28 or obtain/extract auxiliary information from a second channel/signal of the signal 22, while the VCR 26 is operable to perform the other of that which the signal processing device 24 does not accomplish. The VCR 26 is representative of any device operable to receive a signal and process the signal and any auxiliary information as presented herein. It should be appreciated, as above, that the term 'signal' may refer to more than one signal and/or encompass a signal having several channels.

Thus, FIG. 2 illustrates the principles of the present invention when the signal processing device 24 is not capable of receiving two channels or signals in which one channel carries a program and another channel carries auxiliary information. More particularly, when the signal processing device 24 does not have two tuners or other devices operable to receive the appropriate channels/signals and process them, another device (i.e. the VCR 26) is necessary to provide another tuner and processing. One of the two devices must be capable of obtaining/extracting the auxiliary information while the other of the two devices receives the program.

Figure 3:
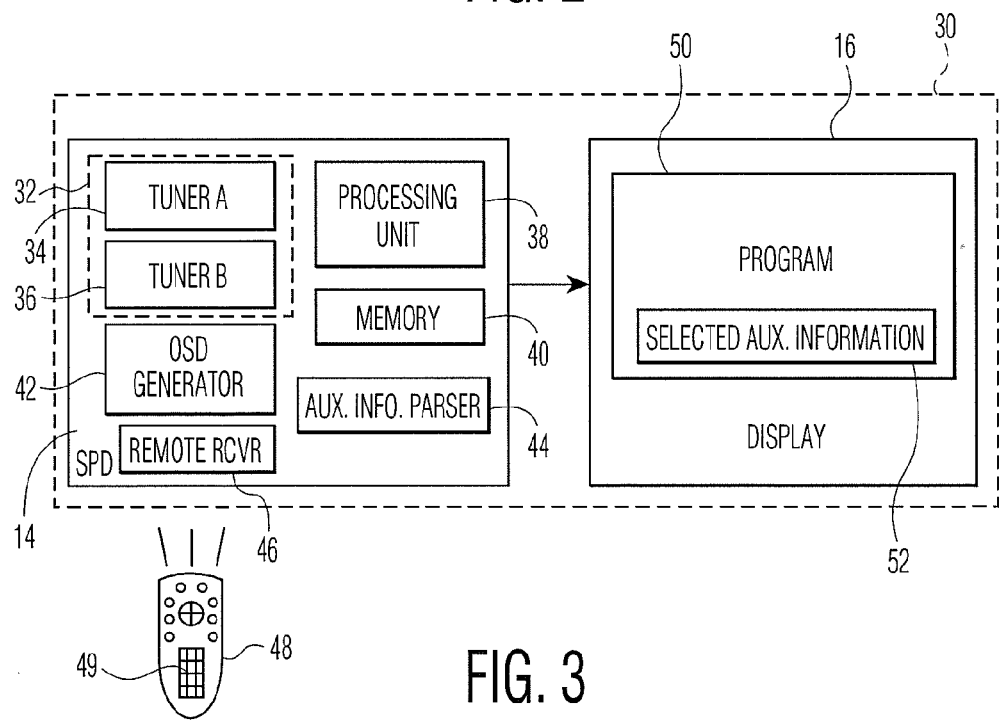
FIG. 3 is a detailed diagrammatic representation of a video processing device operable to implement the principles of the present invention.

Referring to FIG. 3, there is shown a detailed view of the signal processing apparatus 14 and the display 16 shown in FIG. 1. It should be appreciated that, consistent with the principles of the present invention, the signal processing device 14 and the display 16 may be separate as depicted in FIGS. 1 and 2, or may be integral as represented by the dashed line 30. The function and operation of the signal processing device 14 and the display 16 are as indicated herein regardless of their configuration.

The signal processing apparatus 14 includes a tuning section 32 that is operable to tune to the various channels of the incoming signal 12 for further processing. This includes tuning to a channel having programming to view and tuning to a channel having auxiliary information to be selected and presented on the display 16 in addition to the program 50. The signal processing apparatus 14 further includes a processing unit 38, memory 40, an on-screen display (OSD) generator 42, an auxiliary information parser 44, and a remote control signal receiver 46.

In particular, the signal processing apparatus 14 includes a first tuner 34 (Tuner A) and a second tuner 36 (Tuner B) each of which is operable to tune to a channel of the signal 12, each to a separate signal, or combination thereof. In particular, one tuner, arbitrarily Tuner A 34, is tuned to a channel having a program such as is done in a typical television. The tuned channel is processed by the processing unit 38 as is typical in the television art in order to provide the program 50 to the display 16. The selection of a channel for the Tuner A 34 to tune is controlled by the user/viewer typically via a remote 48. Signals from the remote 48 are received by the remote receiver 46 which are processed by the processing unit 38 in order to perform the requisite function. The program 50 of the channel selected by the user via the remote 48, and tuned by the Tuner A 34, is thus displayed on the display 16.

The tuning section 32 also includes a second tuner 36 (Tuner B) that is operable to tune to a channel of the signal 12 that provides the auxiliary information. This may be automatically accomplished by the signal processing apparatus 14 or in response to the user/viewer selecting an appropriate button/key 49 on the remote 48 (or like manner of selection). In any case, the auxiliary information channel is tuned and input to an auxiliary information parser 44 that is operable to extract or obtain the auxiliary information carried by the channel/signal. The auxiliary information may be provided by the channel in addition to other types of information. In the case of an analog signal, the auxiliary information parser may be a VBI parser, where the auxiliary information is contained in the VBI. In the case of a digital signal, the auxiliary information parser may be a digital processing unit operable to extract the auxiliary information from the digital data stream. In both cases, it is preferable to have headers and other identification markers within the auxiliary information. Extraction of the auxiliary information is accomplished with the aid of the processing unit 38. Timing of the extraction of the auxiliary information may be independent of the selection of the type of auxiliary information from the whole of the auxiliary information, or the timing of extraction may be dependent upon the selection process.

In one case, where the user selects the type of information and frequency of display before any extraction and storage of auxiliary information, only the type of auxiliary information chosen may be extracted and stored in the memory 40. Alternatively, all of the auxiliary information may be extracted and stored, while only the selected type of information may be displayed. The selected type of auxiliary information may not be available for immediate display. The selected type of auxiliary information may take anywhere from a few minutes to a few hours to collect and display the particular information, depending on the data rate of the auxiliary information being transmitted within the signal.

In the case where the user selects the type of information and frequency of display after the extraction and storage of the auxiliary information, the entire amount of (all possible) auxiliary information is extracted from the signal and stored in memory. Once the user selects the type of information to display and the frequency of display, the information is retrieved from the memory for display on the screen.

Thus, various information and the auxiliary information may be stored in memory, ready for display on the display 16. Display of the auxiliary information on the display 16 in addition to the program 50 is preferably automatic when enabled by the user. This may be accomplished through an appropriate key 49 on the remote 48. In accordance with an aspect of the present invention, the user is able to select the types and/or categories of the auxiliary information to be displayed on the display 16. As well, the frequency of display of the selected information is selectable by the user/viewer.

The auxiliary data will continuously be stored in memory as it is received even if this function is not enabled by the user. If stored in memory, the new information may overwrite the outdated information. The display of the auxiliary information will be refreshed as new information is transmitted. The data stream may distinguish between repeated and new items.

Figure 4:
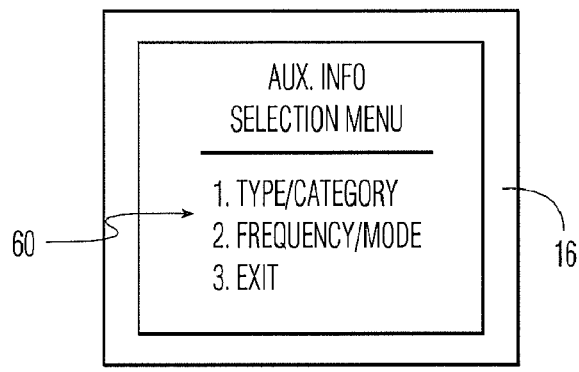
FIG. 4 is a representation of an on-screen menu for selection of auxiliary information and its update frequency.

In one form, the user/viewer is able to select the various types and/or categories of information from the entire amount of auxiliary information that be automatically displayed on the display via an on-screen display, as provided by the OSD generator 42. Reference is now made to FIG. 4 which depicts the display 16 with an exemplary on-screen menu 60 for selecting the type of auxiliary information desired to be displayed as well as the frequency of display of the selected auxiliary information. Selection of the type/category of information allows the user/viewer to select the type of information that will be displayed on the display 16 in accordance with the frequency of the display. The user/viewer may select a single type of information, or a plurality of information.

The user/viewer also may select the frequency of display of the selected type of auxiliary information from the menu 60. The auxiliary information 52 (see FIG. 3) is preferably automatically displayed on the display 16. The auxiliary information may be continuously displayed with updates of the auxiliary information provided in real-time. The auxiliary information may be displayed on at various, selectable intervals (e.g. every fifteen minutes), or on an as the event occurs basis (e.g. a score changes for a sporting event, a breaking news story). Once the various parameters are set by the user/viewer, the selected auxiliary information is provided to the display 16 in addition to the program 50 being viewed (see FIG. 3). The system updates the auxiliary information in real time based on the status of the incoming auxiliary information and frequency selections. Auxiliary information may thus be stored in memory in order to provide such updates. When the frequency is selected to be as the event occurs, an identifier or identifiers in the auxiliary information signal or data stream are checked to determine if a particular auxiliary information has changed or is new such that it needs to be displayed.

Referring back to FIG. 3, the memory 40 is also operable to store program instructions (e.g. software) that are executed by the processing unit 38 in order to provide the various features and functions as presented herein. The memory 40 may also temporarily store information if necessary. Thus, the memory 40 may be RAM, ROM, or other memory operable in the manner set forth.

Operation

Figure 5A:
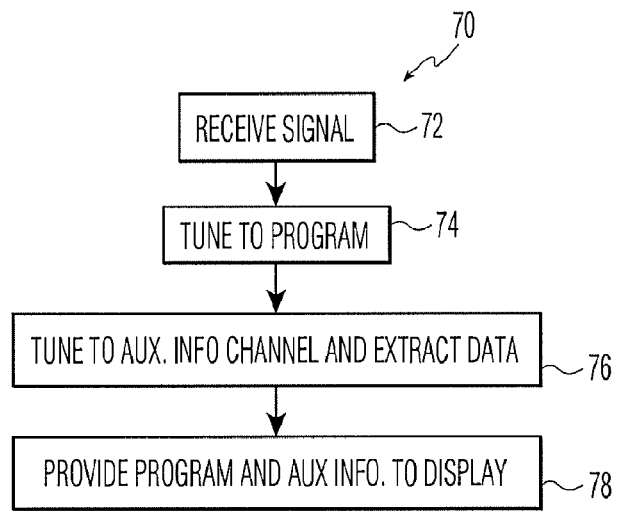
FIG. 5A is a flowchart of a general manner of operation of the present invention in accordance with the principles presented herein.

With reference to FIG. 5A, a manner of operation of the present invention in accordance with the principles set forth herein will now be described. FIG. 5A depicts a flowchart, generally designated 70, of a general manner in which the principles of the present invention may be employed. Initially a signal, as described above, is received, step 72. The user/viewer or signal processing device allows the tuning thereof to a program to view (i.e. a channel of the signal carrying a program), step 74. As well, the signal processing device tunes to the auxiliary information channel and extracts the auxiliary information, step 76. The program and the auxiliary information is then automatically provided to the display, step 78.

Figure 5B:
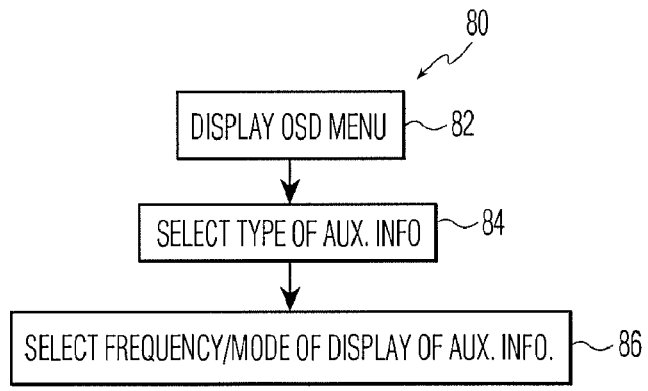
FIG. 5B is a flowchart of an additional manner of operation of the present invention that may be used in conjunction with the manner of operation depicted in the flowchart of FIG. 5A.

Referring to FIG. 5B, there is depicted a flowchart, generally designated 80, of additional steps that may be used in conjunction with the manner of operation as set forth in FIG. 5A. An on-screen auxiliary information menu is displayed upon the user/viewer invoking an auxiliary information menu feature, step 82. The user/viewer then selects the type of auxiliary information to be displayed from the auxiliary information menu 60 (see FIG. 4), step 84. Thereafter, the frequency of display of the selected auxiliary information is selected by the user/viewer, step 86. It should be appreciated that the steps of FIG. 5B may be performed before, simultaneously with, or after the steps of FIG. 5A, if at all. Other ways of allowing user selection of the auxiliary information may be used rather than via an on-screen menu.

The selected preferences may be stored in memory in a user/viewer profile if desired such that the same auxiliary information may be displayed upon powering up the signal processing device. Alternatively, such auxiliary information selections may need to be made after powering down the signal processing device.

It should be appreciated that the present invention allows information regarding any topic, category, or type (assuming it is provided by the auxiliary information service) to be automatically displayed on the display in addition to a program and irrespective of the content of the program. In this manner, the user/viewer has control over when and which data to monitor.

While this invention has been described as having a preferred design and/or configuration, the present invention can be further modified within the spirit and scope of the disclosure.

What is claimed is:

1. A method for displaying user selected information comprising the steps of:
   providing video information received from a first source for display;
   receiving a selected information from a second source; and
   providing the selected information for display while the video information is being displayed, wherein display of the selected information is controlled by a user variable frequency of display parameter that determines when the selected information is displayed.

2. The method of claim 1, wherein the selected information is selected from a type of information on a variety of topics.

3. The method of claim 1, further comprising the step of:
   automatically displaying the selected information irrespective of content of the video.

4. The method of claim 3, further comprising the step of:
   selecting a schedule for determining the frequency of display for automatically displaying the selected information, wherein
   said schedule is modifiable by a user and
   said schedule represents a user selectable interval of time that determines a time interval between when said selected information is displayed.

5. The method of claim 4, wherein the step of selecting a schedule includes the steps of:
   selecting between frequency of display options of: (i) a continuous display of the selected type of the received information; (ii) periodic display of the selected type of the received information; and (iii) as a status change occurs display of the selected type of the received information.

6. The method of claim 5, wherein the step of selecting between the frequency of display option of as a status change occurs includes the step of:
   selecting at least one of as an event changes and as an event is new.

7. The method of claim 2, further comprising the step of selecting a type of the received information from the variety of subjects includes the step of:
   providing an on-screen display of a selection menu.

8. The method of claim 2, wherein the step of automatically displaying the selected type of information includes the step of:
   displaying the selected type of information within an image displayed on the display device auxiliary to the display of the video from the first source on the display device.

9. A video processing television apparatus comprising:
   a first means for receiving a program;
   a means for selecting information to be received;
   a second means for receiving the selected information;
   a means for displaying the program; and
   a means for displaying the selected information during display of the program, wherein said selected information is displayed in accordance with a user variable frequency of display parameter that controls when said selected information is displayed.

10. The apparatus of claim 9, wherein the means for displaying the selected information includes a means for automatically displaying the selected information irrespective of content of the program.

11. The apparatus of claim 9, wherein the means for selecting a type of information to be received includes means for selecting a type of information from information on a variety of topics.

12. The apparatus of claim 9, further comprising:
   a means for selecting the frequency of display of the selected information.

13. The apparatus of claim 12, wherein said means for selecting the frequency of display of the selected information on the means for displaying includes:
   a means for selecting one of (i) a continuous display of the selected information; (ii) periodic display of the selected information; and (iii) as a status change occurs display of the selected information.

14. The apparatus of claim 13, wherein the means for selecting one of (i) a continuous display of the selected information; (ii) periodic display of the selected information; and (iii) as a status change occurs display of the selected information, includes a means for selecting at least one of (a) as an event changes and (b) as an event is new, in the case of selection of as a status change occurs display of the selected information.

15. The apparatus of claim 9, further comprising:
a means for generating an on-screen display menu operable to permit user selection of the type of information to be received.

16. The apparatus of claim 9, further comprising:
a means for displaying the selected information within an image displayed on the means for displaying the image being auxiliary to the display of the program.

17. A television signal receiving apparatus comprising:
a processing unit;
a first tuner in communication with said processing unit and operable to receive a program from a first source;
a second tuner in communication with said processing unit and operable to receive auxiliary information on a variety of topics from a second source;
an auxiliary information parser in communication with said processing unit and said second tuner and operable to extract the auxiliary information from the second source;
means for selecting a type of the auxiliary information from the variety of topics for display; and
a display in communication with said processing unit, said first tuner, and said second tuner;
wherein said processing unit is operable to display the program on the display and concurrently display the selected type of auxiliary information on the display irrespective of the content of the program, and said display of said auxiliary information is controlled by a user variable frequency of display parameter that determines the frequency of when auxiliary information is displayed.

18. The television signal receiving apparatus of claim 17, further comprising:
an on-screen display generator in communication with said processing unit and said display, and operable to provide an on-screen menu adapted to allow selection of types of auxiliary information by a user.

19. The television signal receiving apparatus of claim 17, further comprising:
means for selecting said user variable frequency of display parameter as a modifiable time interval that determines a length of time in between when said auxiliary information is displayed.

20. The television signal receiving apparatus of claim 17, wherein the processing unit is operable to display the selected type of the auxiliary information within an image displayed on said display in addition to the display of the program.

\* \* \* \* \*